United States Patent
Bolin et al.

(10) Patent No.: US 8,522,419 B1
(45) Date of Patent: *Sep. 3, 2013

(54) WORKPIECE VIBRATION REDUCTION

(71) Applicant: The Boeing Company, Chicago, IL (US)

(72) Inventors: Jared L. Bolin, New Athens, IL (US); Ryan L. Hanks, Shipman, IL (US); Eric J. Stern, Valmeyer, IL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,313

(22) Filed: Dec. 4, 2012

Related U.S. Application Data

(63) Continuation of application No. 12/348,714, filed on Jan. 5, 2009.

(51) Int. Cl.
*B23P 11/00* (2006.01)
*B23C 5/00* (2006.01)
*B23Q 11/00* (2006.01)

(52) U.S. Cl.
USPC ............. 29/557; 409/131; 409/141; 409/234; 409/180

(58) Field of Classification Search
USPC .................. 409/132, 131, 141, 232, 234, 180; 408/143, 1 R; 144/145.3, 253.3; 29/557–558
See application file for complete search history.

(56) References Cited

U.S. PATENT DOCUMENTS

| | | | |
|---|---|---|---|
| 3,289,717 A | 12/1966 | Dutot | |
| 3,289,771 A | 12/1966 | Bennett | |
| 4,168,730 A * | 9/1979 | Keller | 144/371 |
| 4,993,894 A | 2/1991 | Fischer | |
| 5,074,723 A | 12/1991 | Massa | |
| 6,048,142 A | 4/2000 | Hashimoto | |
| 6,071,219 A | 6/2000 | Cook | |
| 6,887,017 B2 | 5/2005 | Klesser | |
| 7,452,169 B2 | 11/2008 | Tart | |
| 2005/0214087 A1 | 9/2005 | Agapiou | |
| 2007/0226985 A1 | 10/2007 | Paton | |

OTHER PUBLICATIONS

Stephenson et al., "Machining Dynamics", Metal Cutting Theory and Practice, 2nd edition, Chapter 12, Dec. 2005, 87 pgs.

* cited by examiner

*Primary Examiner* — Erica E Cadugan
(74) *Attorney, Agent, or Firm* — Caven & Aghevli LLC

(57) ABSTRACT

Techniques and apparatuses to provide vibration reduction of a workpiece when performing machining operations are disclosed. In various embodiments, a machine tool includes a shank having at least one end configured for engagement with a machine operable to rotate the shank. A cutting portion has a diameter defined by features used to remove material from a workpiece. The cutting portion is coupled to the shank. A vibration reduction dampener may be located between the shank and the workpiece.

11 Claims, 8 Drawing Sheets

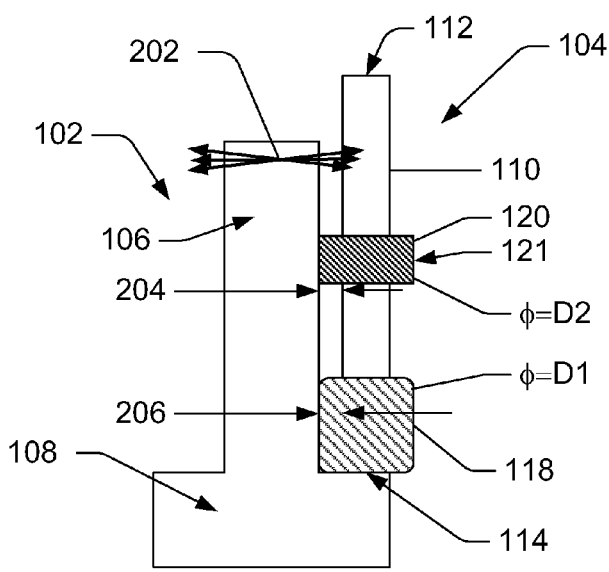
*Fig. 2*
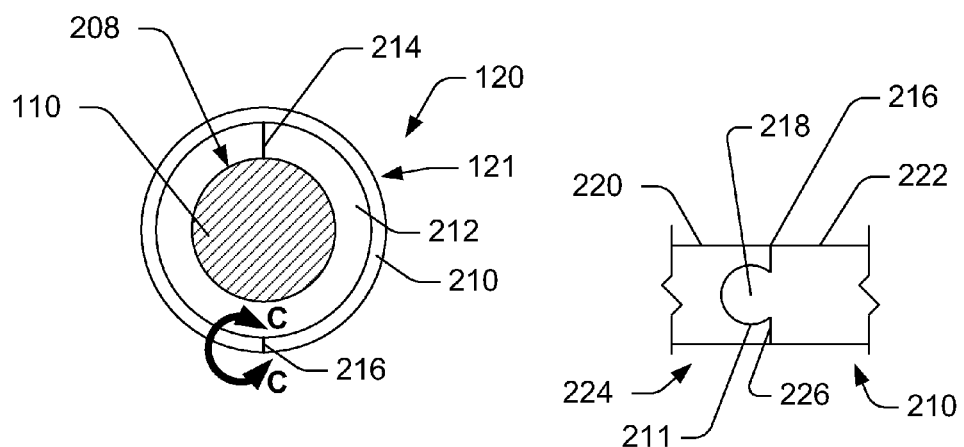
Cross Section B-B
*Fig. 2a*
Section C-C
*Fig. 2b*

Cross Section D-D

Cross Section D-D

WORKPIECE VIBRATION REDUCTION

RELATED APPLICATIONS

This application is a continuation of U.S. patent application Ser. No. 12/348,714 to Bolin, et al., entitled WORKPIECE VIBRATION REDUCTION, the disclosure of which is incorporated herein by reference in its entirety.

TECHNICAL FIELD

The present disclosure teaches methods and apparatuses for reduction of workpiece vibration, and more specifically, to methods and apparatuses to reduce workpiece vibration when performing machining operations on thin features of a workpiece.

BACKGROUND

Many parts are created by machining a workpiece to remove material. In particular, industries that have many specialized parts often create parts by machining them rather than incurring capital expenditures to create the parts using other methods, such as by casting the parts using a mold. In other situations, machining a part (workpiece) may be necessary to finish a surface in accordance with a particular specification. For example, in the aerospace industry, machined parts typically have to adhere to design tolerances having small ranges for variance, and thus require precise manufacturing, which often includes a machining process when parts are formed from metal. The workpiece may be formed of virtually any material that may be machined including varieties of wood, metals, and composites.

One particular machining operation involves removing material using a milling tool, which removes material by cutting away at an engagement area on a workpiece as the milling tool rotates along an axis that is perpendicular to an engagement direction of the milling tool. Milling tools (or bits) efficiently remove undesired material from the surface of a workpiece to create the part. However, milling tools may have some drawbacks. One drawback when using milling tools may be a propensity for the milling tool to cause a workpiece and/or the milling tool to vibrate or chatter. Chatter is particularly prevalent in relatively thin parts that have a small thickness to height ratio. Besides being noisy, vibrations may also have an undesirable affect on the finish of a workpiece, such as by creating cuts that are deeper than intended thereby resulting in out-of-tolerance portions of the part. In addition, vibrations may generate increased heat, shorten an effective lifespan of the milling tool, or otherwise cause adverse affects to the workpiece or milling tool.

In some circumstances, a thin workpiece may be stiffened to reduce vibrations by adding additional mass or pressure to the workpiece. Pressure may be asserted on the workpiece manually (e.g., by operator, etc.) or by a tool. In an example, a weighted strip may be attached to the side of the workpiece that is not being machined. The weighted strip may reduce chatter and vibrations by increasing the total mass of the thin feature, thus counteracting forces that initiate vibration (at least initially). In some instances, weighted strips may be impractical (e.g., due to space constraints, etc.), time consuming to implement, or ineffective at limiting vibrations to an acceptable level.

Therefore, it would be desirable to have a method and/or apparatus that overcomes one or more of the issues described above, as well as other possible issues.

SUMMARY

Embodiments of methods and apparatuses to provide vibration reduction when machining a workpiece are disclosed. The various embodiments may advantageously improve machining operations to conform to established tolerances, reduce setup time, reduce noise, and increase a lifespan for a milling tool, among other benefits possible during machining of a workpiece.

In one embodiment, a machine tool includes a shank having at least one end configured for engagement with a machine operable to rotate the shank. A cutting portion has a diameter defined by features used to remove material from a workpiece. The cutting portion is coupled to the shank. A vibration reduction collar may be coupled to the shank between the first end and the second end. The vibration reduction dampener may have located between the shank and the workpiece.

In a further embodiment, a method of dampening vibration of a workpiece during a machining operation includes placing a vibration dampener between a shank of a machine tool and workpiece. The dampener may be engaged against the shank and the workpiece when a cutting portion of the machine tool engages the workpiece on a cutting surface. Work may be performed on the workpiece by rotating the shank, where the vibration dampener absorbs vibrations of the workpiece that are caused by the performed work.

The features, functions, and advantages can be achieved independently in various embodiments of the present disclosure or may be combined in yet other embodiments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2 is an illustration of a side elevation view of the workpiece and machine tool of FIG. 1 where the machine tool includes a dampener in accordance with another embodiment of the disclosure.

FIG. 2a is an illustration of a cross sectional view of the dampener of FIG. 2 showing illustrative layers of material.

FIG. 2b an illustration that shows an illustrative joiner to secure ends of the dampener.

DETAILED DESCRIPTION

Overview

As discussed above, workpiece vibrations may occur when performing machining operations on relatively thin portions of the workpiece. For example, a stiffener or rib that is used to strengthen a part is typically a thin extrusion, which may be particularly prevalent in context of aerospace manufacturing. Workpiece vibrations may occur during many different material processes. Workpiece vibrations may be common during milling operations of hard metals such as titanium or steel. Workpiece vibrations may result in deflections of the workpiece and/or machine tool, which may cause noise, undesirable part finish, or shortened tool lifespan. As disclosed here, a vibration dampener may be configured with the machine tool and/or the workpiece to dampen workpiece vibrations.

Vibration Reduction on Tool

Figure 1:
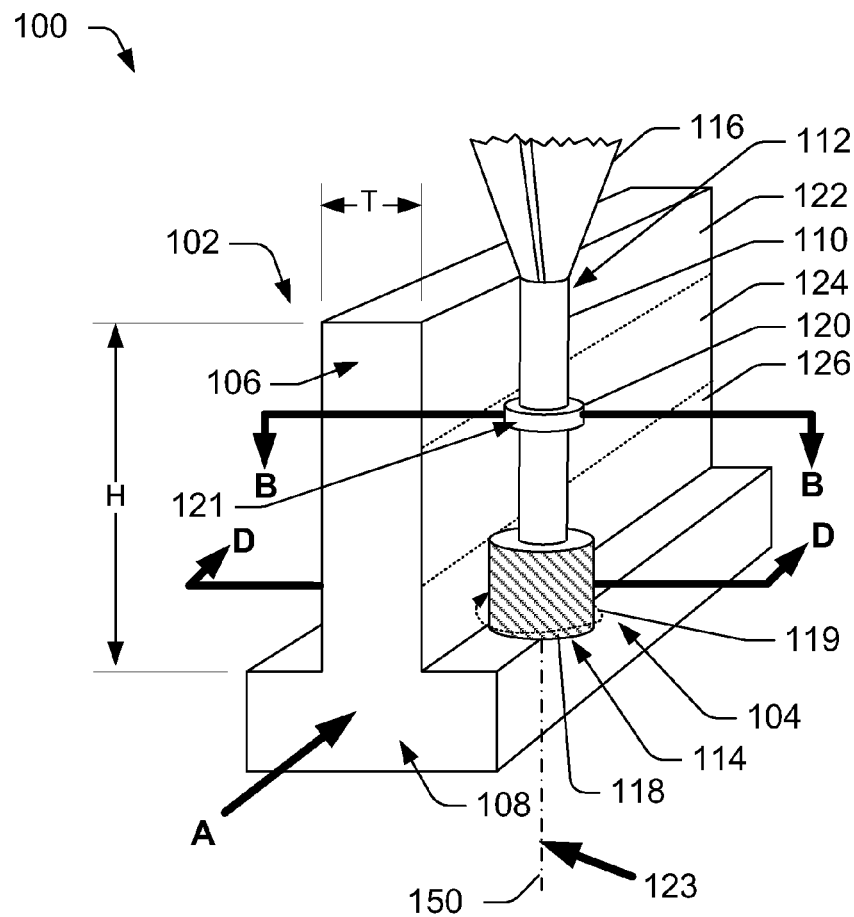
FIG. 1 is an illustration of an isometric view of a workpiece and a machine tool having a dampener in accordance with an embodiment of the disclosure.

FIG. 1 is an isometric view of an illustrative machining configuration 100 of a workpiece 102 and a machine tool 104 having a dampener 120 in accordance with an embodiment of the disclosure. As shown, the workpiece 102 may undergo machining operations using the machine tool 104 to remove undesired material from the workpiece.

The workpiece 102 may include a relatively thin feature 106, which may be defined by a ratio of thickness T to height H, where H>>T. The thin feature 106 may be susceptible to vibrations when a machining operation is performed on the workpiece 102 using the machine tool 104. The thin feature 106 may be, without limitation, a rib or other structural support that resists deformation of a base 108 of the workpiece 102. The workpiece 102 may be formed of one or more materials, including without limitation, titanium, composite, steel, aluminum, wood, plastic, or other materials which may undergo machining operations to create a part from a workpiece. Each material may have unique properties that relate to vibration, heat, or tool lifespan. For example, titanium is a relatively hard metal with low heat conducting properties, which transfer heat generated during machining operations to the machine tool 104.

The machine tool 104 may be any tool used to remove material from the workpiece 102, such as a milling tool, drilling tool, sanding disk, and so forth. The machine tool 104 includes a shank 110. Typically, the shank 110 is a cylindrical shank, but may include other cross sectional shapes, such as hexagonal cross section. The shank 110 includes a first end 112 and a second end 114 distal from the first end. The first end 112 of the shank 110 may be engaged by a clamp 116 (e.g., a chuck) to securely attach the machine tool 104 to a machine that moves the machine tool 104, such as by providing angular rotation of the shank 110. The second end 114 of the shank 110 includes the cutting portion 118 of the machine tool 104. The cutting portion 118 may remove material from the workpiece 102 via rotational motion 119 about an axis 150 substantially perpendicular to an engagement direction 123 during engagement with the workpiece 102.

The cutting portion 118 may include cutting features that remove material upon engagement with the workpiece. The cutting portion 118 may include a series of blades, which may have an axial rake that varies depending on the material of the workpiece 102. Alternatively, the cutting portion 118 may include other surfaces to facilitate cutting, sanding, polishing, or performing other machining operations on the workpiece 102.

In various embodiments, the machine tool 104 may be a milling tool. Due to the lateral engagement via the engagement direction of the cutting portion 118 against the workpiece 102, an asymmetrical force may be exerted against the machine tool 104 that translates to the workpiece. The asymmetrical force typically causes vibrations (deflections) to occur in the thin portion 106 of the workpiece 102 and/or the machine tool 104. Other tools, such as a drilling tool (i.e., drill bit, end mill, etc.) operate by engaging the workpiece in a straight down motion relative to the clamp 116. Drilling tools typically apply substantially symmetrical forces (depending on cutting blade configuration), and may cause workpiece vibrations. However, drilling tools typically create less vibration than lateral engagement machine tools.

In accordance with embodiments of the disclosure, the machine tool 104 may include a dampener 120 along the shank 110 between the first end 112 and the cutting portion 118 at the second end 114. The dampener 120 may reduce workpiece vibrations and chatter of the workpiece 102 or the machine tool 104 by applying resistance to deflections of these components to thereby dampen the vibration and resist deflection. As shown in FIG. 1, the dampener 120 may be coupled to the shank 110 and engage the workpiece during a machining operation. The dampener 120 will be described in further detail below in FIGS. 2-4.

During a machining operation, material is removed by the cutting portion 118 of the machine tool 104. When the machine tool 104 is a milling tool, material may be removed in levels, where each level is less than or equal to the size (height) of the cutting face of the machine tool 104. For example, the workpiece 102 may include a machining operation that begins on the top (side opposite the base 108). In a first pass, material in a first level 122 may be removed from the workpiece 102. Subsequent passes may remove material from the second level 124 and a subsequent level 126, where any number of levels may be created during the machining operation. Typically, as the machining operation moves to subsequent levels (e.g., from the first level 122 to the second level 124), the workpiece becomes thinner, and may thus more likely to vibrate and/or chatter. Thus, the dampener 120 may not be necessary or be positioned to engage the workpiece when machining the first or first few levels, but may engage the workpiece during machining operations of subsequent levels.

FIG. 2 is a side elevation view of the illustrative machining configuration 100 from a viewpoint A shown in FIG. 1. As shown illustrated in FIG. 2, the cutting portion 118 of the machine tool 104 is engaged with the thin feature 106 of the workpiece 102 during a machining operation. During the machining operation, the thin feature 106 may experience vibration 202, such that the thin feature may deflect laterally in alternating directions substantially parallel to the base 108.

The machine tool 104 includes the cutting portion 118 having a cutting diameter D1. The dampener 120, having a dampener diameter D2, is coupled to the shank 110 of the machine tool 104. In some embodiments, the dampener diameter D2 is greater than the cutting diameter D1 such that the dampener 120 engages the thin feature 106 during the machining operation. However, in some embodiments, the dampener diameter D2 may be less than or equal to the cutting diameter D1, which may reduce pressure against the thin feature 106.

The dampener 120 may be formed of a material 121 that ideally includes properties to reduce vibration and noise and extend tool life (or not increase tool wear). The material 121 may be compressible to dampen vibrations and reduce noise when the dampener 120 is in contact with both the machine tool 104 and the workpiece 102. For example, the dampener diameter D2 may be greater than the cutting diameter D1 prior to engagement of the cutting portion 118 to the workpiece 102. Upon engagement of the cutting portion 118 to the workpiece 102, the dampener 120 may compress, creating a resistance force outward and substantially perpendicular to the workpiece 102, where a dampener gap 204 may be compressed to be substantially similar to a cutting depth 206. In addition, the material 121 may resist heat, which may increase life of the dampener 120. The material 121 may also include a low coefficient of friction and may be abrasion resistant, which may minimize heat transfer or generation on the workpiece 102 and minimize alterations (e.g., marring, etc.) to the workpiece 102 where the dampener 120 engages the workpiece 102. In some embodiments, the dampener 120 may be formed of ultra high molecular weight polyethylene (UHMWP), although other materials may be used that include one or more of the properties discussed above.

FIG. 2a is a cross sectional view of the dampener 120 of FIG. 2 taken through B-B to show illustrative layers of the material 121 of the dampener being applied to the shank to form the dampener 120. In various embodiments, the material 121 may be applied to the shank 110 using an adhesive 208. Strips of the material 121 may be wrapped around the shank 110 to form the dampener 120. The adhesive 208 may be applied to the material 121 in the form of, without limitation, an adhesive backing (e.g., a tape) or may be a separate adhesive (e.g., glue) that is used to attach the dampener 120 to the shank 110 and/or create layers of the material 121 to form the dampener 120. In one embodiment, at least two layers of UHMWP are wrapped around the shank 110 to create the dampener 120, where a thin second layer 210 covers a thicker first layer 212. The second layer 210 may cover an inner seam 214 of the first layer 212 to secure the first layer 212 to the shank 110. An outer seam 216 may be sealed to create a smooth exterior finish of the dampener 120. More or fewer layers may be used to create the dampener 120 and securely attach the dampener to the shank 110.

FIG. 2b shows an illustrative joiner 218 to secure the ends of the dampener from a viewpoint C shown in FIG. 2a. The joiner 218 may join a first side 220 of the dampener 120 to a second side 222 of a layer of material 224 at a seam 226 such as at the inner seam 214 and/or the outer seam 216. The joiner may strengthen the seam 226 by creating a locking connection between the first side 220 and the second side 222 of the layer of material 224 (which may correspond to the first layer 212 or the second layer 210). The seam 226 may also optionally include an adhesive 211 to further strengthen the seam. FIG. 2b shows one illustrative configuration of the joiner 218, however, other configurations are contemplated that secure the first side 220 to the second side 222.

Figure 2C:
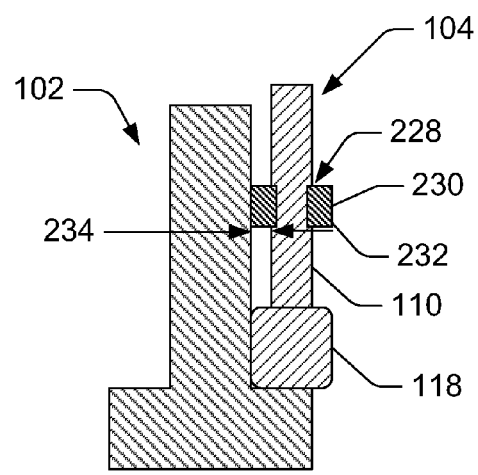
FIG. 2c is an illustration of a cross sectional view of the workpiece and machine tool of FIG. 1 where the machine tool includes a recess to house a vibration reduction collar in accordance with yet another embodiment of the disclosure.

FIG. 2c is a cross sectional view of the workpiece 102 and milling tool 104 of FIG. 1 taken through section D-D as shown in FIG. 1. In accordance with various embodiments, the dampener 120 may be a single piece of the material 121 in the form of a collar 230. The collar 230 may be attached to the shank 110 via the adhesive 208 (FIG. 2a) or by a friction fit. For example, the collar 230 may be press fit on the shank 110 such that the friction of the collar 230 securely positions the collar 230 on the shank 110 in a desired location. The collar 230 may also be attached to the shank 110 by heating the collar to shrink fit the collar 230 to the shank 110, among other techniques to securely attach the collar 230 to the shank 110.

In some embodiments, the milling tool 104 includes a recess 228 to house a vibration reduction collar 230. The recess may be formed by removing material from the shank 110, by adding material to the shank 110 to create a shoulder 232, or a combination thereof. The recess 228 may enable an enlarged dampener gap 234, which may enable greater compression of the dampener 120 than available with the dampener gap 204 of FIG. 2. The shoulder 232 and/or the recess 228 may act to secure the vibration reduction collar 230 in a fixed vertical location along the shank 110.

Figure 2D:
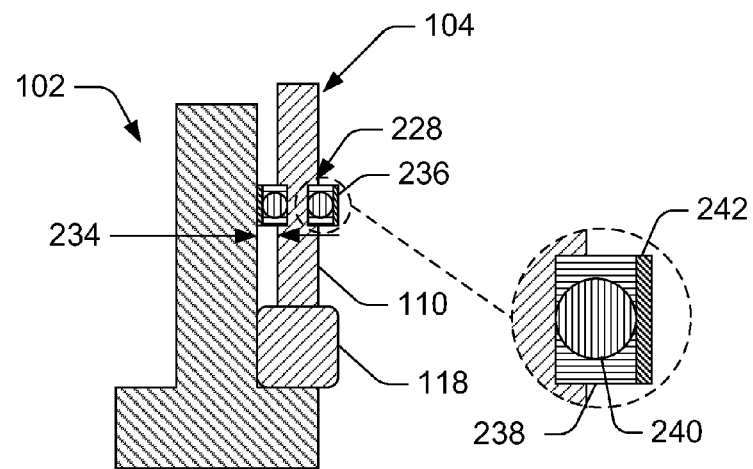
FIG. 2d is an illustration of a cross sectional view of the workpiece and machine tool of FIG. 1 where the machine tool includes a vibration reduction bearing in accordance with an embodiment of the disclosure.

FIG. 2d is a cross sectional view of the workpiece 102 and milling tool 104 of FIG. 1 also taken through section D-D in FIG. 1. In yet another embodiment, the milling tool includes a vibration reduction device 236 including a housing 238 and a friction reduction component 240 such as a bearing. The vibration reduction device 236 may engage the workpiece 102 and reduce vibration, while reducing or removing friction or abrasion between the workpiece 102, the machine tool 104, and the vibration reduction device 236. In addition, the vibration reduction device 236 may optionally include a material layer 242 around the outer diameter of the vibration reduction device 236. The material layer 242 may have similar properties as described above for the dampener 120 of FIG. 2. However, because the vibration reduction device 236 includes a friction reduction component 240, the material may instead optionally have a high coefficient of friction to engage the workpiece 102. In some embodiments, the vibration reduction device 236 may be fixably attached to the shank 110, such as by a weld of the housing 238 to the shank 110, to strengthen the shank 110 when the vibration reduction device 236 is attached to the shank 110 in the recess 228.

Illustrative Vibration Reduction on Workpiece

Figure 3:
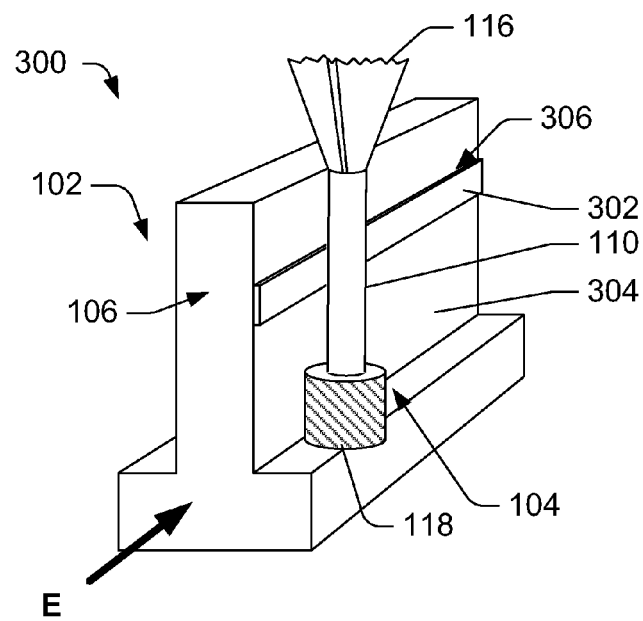
FIG. 3 is an illustration of an isometric view of a workpiece having a dampener and a machine tool in accordance with another embodiment of the disclosure.

FIG. 3 is an isometric view of an illustrative machining configuration 300 of a workpiece having a dampener and a milling tool in accordance with another embodiment of the disclosure. The workpiece 102 may include a dampener 302 along a cutting surface 304 of the thin feature 106. The dampener 302 may engage the shank 110 of the machine tool 104 when the cutting portion 118 engages the cutting surface 304 during a machining operation. As such, the dampener 302 may dampen vibrations and deflections to reduce workpiece vibrations.

In accordance with embodiments, the dampener 302 may be removably applied to the workpiece using an adhesive 306. The adhesive 306 may be applied to the material in the form of, without limitation, an adhesive backing (e.g., a tape) or may be a separate adhesive (e.g., glue) that is used to attach the dampener 302 to the workpiece 102. The adhesive 306 may be created to enable an efficient removal, such that the dampener 302 and adhesive 306 may be removed from the cutting surface 304 in a short period of time (e.g., minimized clean up, etc.). In addition, the adhesive may prevent marring the surface of the workpiece.

The dampener 302 may be formed of a material similar or identical to the material disclosed above regarding the dampener 120 of FIG. 1. For example, the dampener 302 may be formed of ultra high molecular weight polyethylene (UHMWP), although other materials may be used which include properties to reduce vibration and noise and extend tool life. The material may be compressible to dampen vibrations and reduce noise when the dampener 120 is in contact with both the machine tool 104 and the workpiece 102. The dampener 302 may be formed from a single material or layer thereof, or by applying multiple materials and/or layers. For example, a first layer that includes a property of compressibility may be applied against the workpiece 102 while a second layer may be applied over the first layer where the second layer includes the property of a low coefficient of friction.

Figure 4:
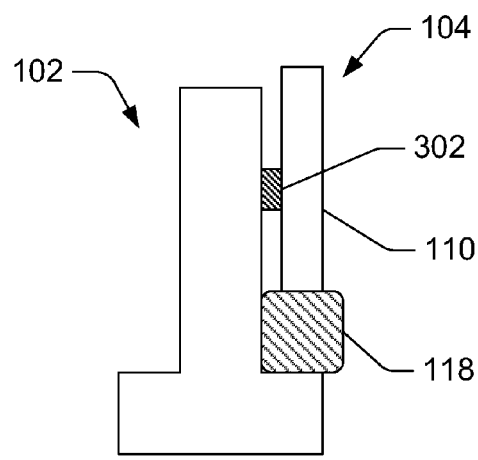
FIG. 4 is an illustration of a side elevation view of the workpiece and machine tool of FIG. 3 where the workpiece includes the dampener in accordance with another embodiment of the disclosure.

FIG. 4 is a side elevation view of the workpiece and milling tool shown from a viewpoint E of FIG. 3, where the workpiece includes the dampener 302 in accordance with another embodiment of the disclosure. The dampener 302 may be in compression when the cutting portion 118 of the machine tool 104 engages the workpiece 102 during a machining operation to remove material from the workpiece.

Although FIGS. 1-4 show a machine tool that rotates about the axis 150 perpendicular to the engagement direction 123 of the machine tool 104 on the workpiece 102, other tools which remove material by using a motion other than the rotational motion 119 (FIG. 1) may be used (e.g., a linear motion such as a saw, plane sander, etc.).

Illustrative Operation

Figure 5:
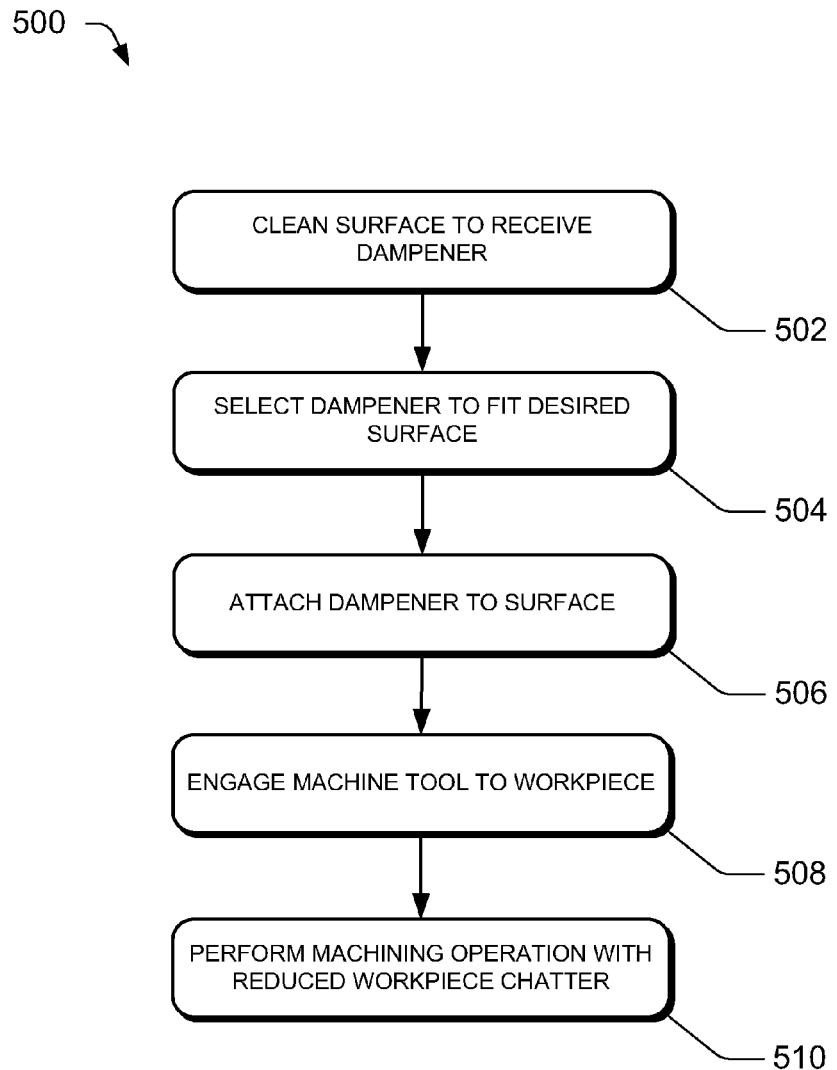
FIG. 5 is an illustration of a flow diagram of an illustrative process of reducing workpiece vibrations of a machining operation in accordance with an embodiment of the disclosure.

FIG. 5 is a flow diagram of an illustrative process 500 of reducing workpiece vibrations of a machining operation in accordance with an embodiment of the disclosure. The process 500 may be used during a machining operation that implements workpiece vibration reduction using the apparatus of FIGS. 1-4. The order in which the operations are described is not intended to be construed as a limitation, and any number of the described blocks can be combined in any order and/or in parallel to implement the process 500.

At 502, the surface where the damper is applied may be cleaned prior to attaching the dampener to enable secure attachment of the dampener to the surface, such as with an adhesive. For example, the surface may be the cutting surface 304 of the workpiece 102 as shown in FIG. 4 or the shank 110 of the machine tool 104, as shown in FIGS. 1-3.

At 504, a dampener may be selected to attach to the surface. In some embodiments, the dampener may be layered in strips with an adhesive strip (e.g., tape). The strips may be cut to length such as the length of the cutting surface 304, the circumference of the shank 110, and so forth. Alternatively, a collar dampener, such as a vibration reduction collar having a bearing or a solid material with a low coefficient of friction, may be selected for placement on the shank 110.

At 506, the dampener may be applied to the workpiece 102 or the shank 110, depending on the configuration of the dampener. For example, when the dampener (e.g., the dampener 302) is attached to the cutting surface 304 of the workpiece 102, the dampener may be glued or attached to the workpiece 102 via the adhesive 306. When the dampener (e.g., the dampener 120) is attached to the shank 110 of the machine tool 104, the dampener may be attached with the adhesive 208, pressed on, secured by heating process (shrink fit), or attached via another process to securely couple the dampener to the shank 110.

At 508, the machine tool may engage the workpiece to perform work on the workpiece (e.g., remove material from the workpiece). The dampener may be compressed between the shank 110 of the machine tool 104 and the workpiece 102.

At 510, work may be performed on the workpiece 102 by the machine tool 104. When the cutting portion 118 of the machine tool 104 is engaging the workpiece 102 and removing material, the dampener 120 and/or the dampener 302 may dampen vibrations of the workpiece and/or machine tool as described herein.

Figure 6:
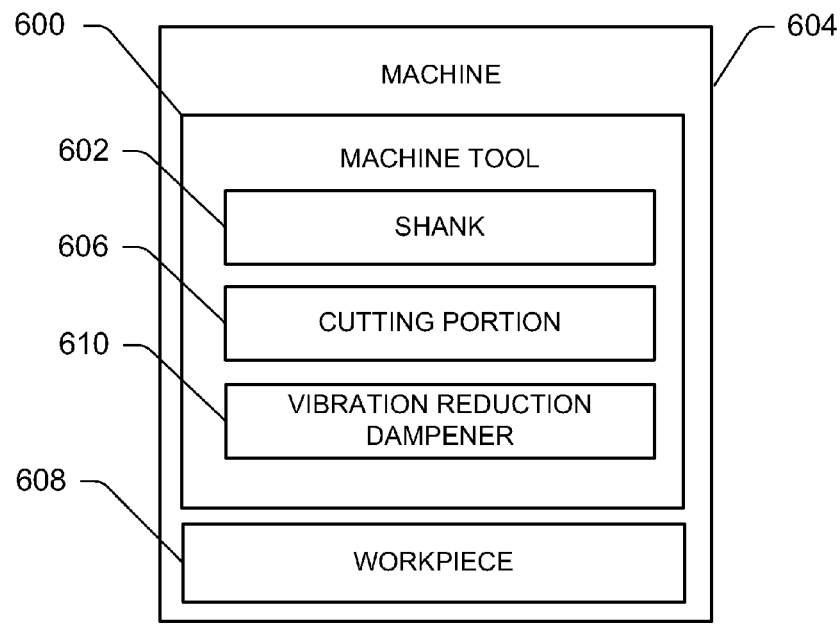
FIG. 6 is an illustration of a functional block diagram of a machining tool.

FIG. 6 is a functional block diagram of a machining tool 600. In various embodiments, the machine tool includes a shank 602 having at least one end configured for engagement with a machine 604 operable to rotate the shank 602. In some embodiments, both ends of the shank may be configured for engagement with the machine 604. A cutting portion 606 may be located proximate the second end of the shank 602. The cutting portion 606 may have a diameter defined by features used to remove material from a workpiece 608. A vibration reduction dampener 610 may be located between the shank 602 and the workpiece 608.

Figure 7:
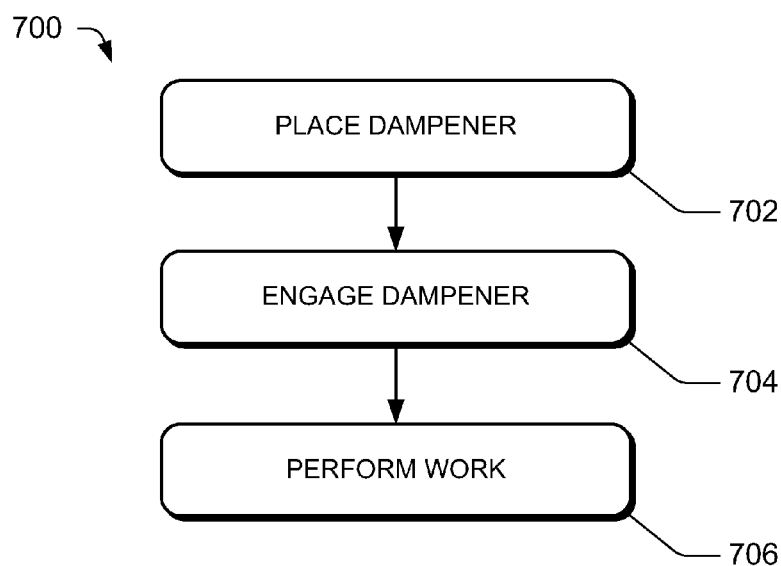
FIG. 7 is an illustration of a block diagram of a process of damping vibration of a workpiece during a machining operation.

FIG. 7 is a block diagram of a process 700 of damping vibration of a workpiece during a machining operation. The process 700 may include a first operation 702 to place a vibration dampener between a shank of a machine tool and a workpiece. A second operation 704 may include engaging the dampener against the shank and the workpiece when a cutting portion of the machine tool engages the workpiece on a cutting surface. A third operation 706 may include performing work on the workpiece by rotating the shank. During the work, the vibration dampener may absorb vibrations of the workpiece that are caused by the performed work.

Illustrative Manufacturing

Figure 8:
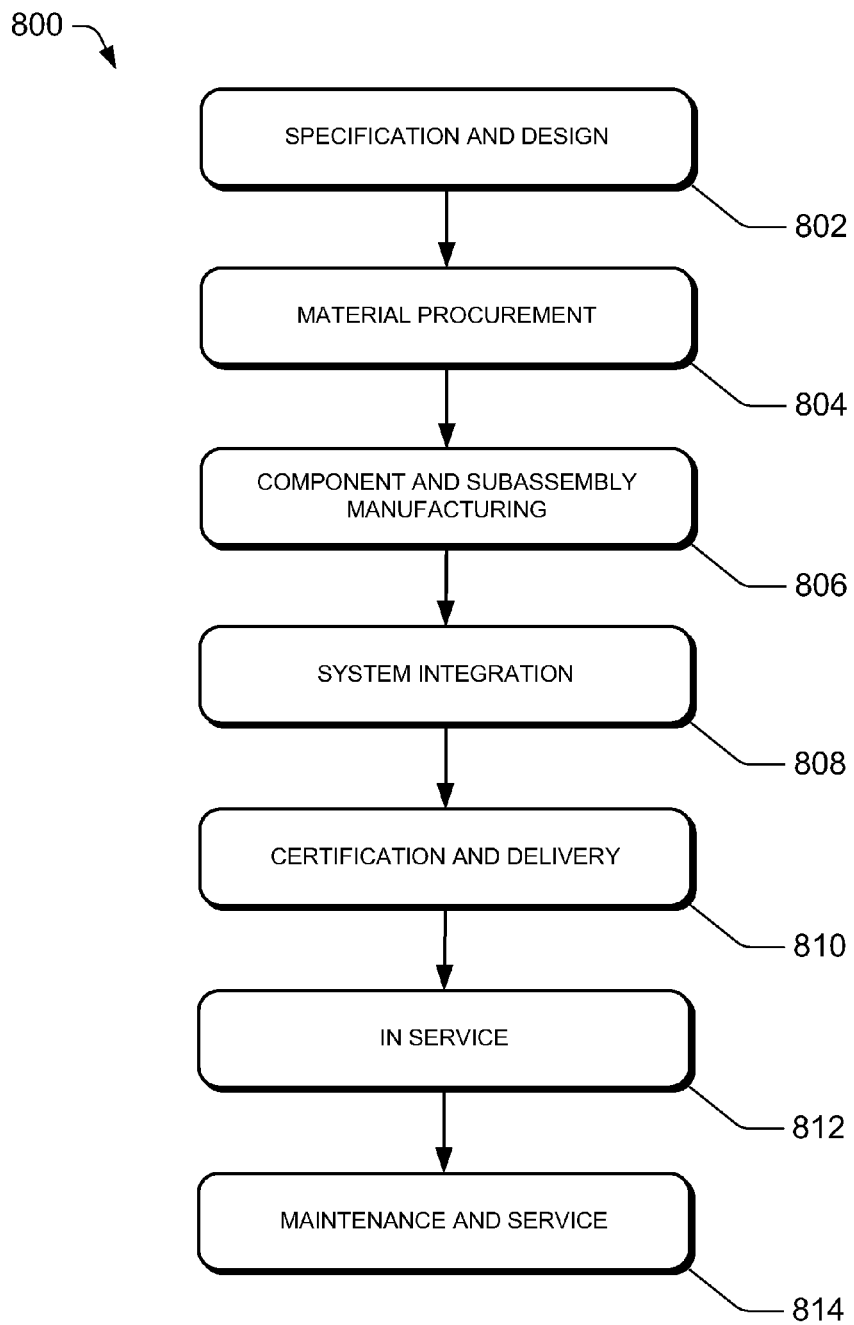
FIG. 8 is a flow diagram of aircraft production and service methodology.
Figure 9:
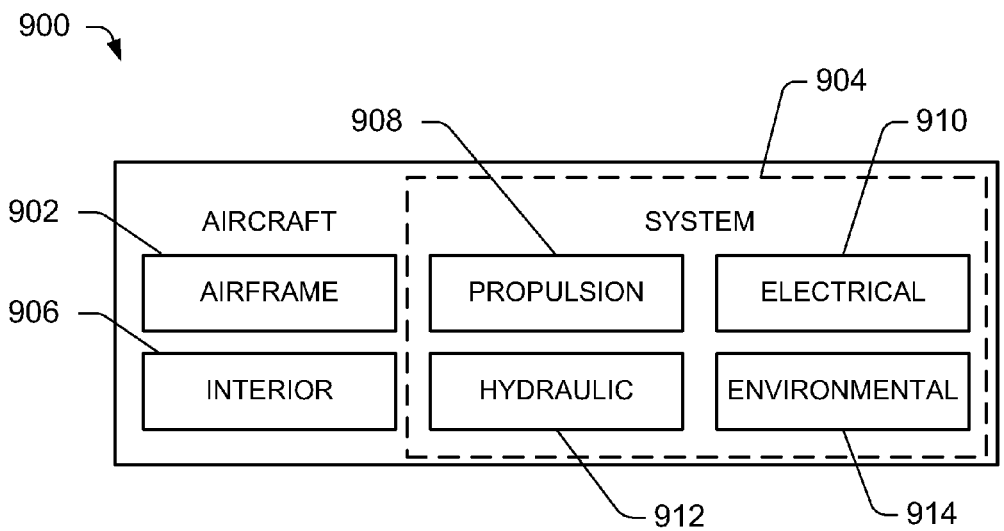
FIG. 9 is an illustration of a block diagram of an aircraft.

Referring more particularly to the drawings, embodiments of the disclosure may be described in the context of an aircraft manufacturing and service method 800 as shown in FIG. 8 and an aircraft 900 as shown in FIG. 9. During pre-production, exemplary method 800 may include specification and design 802 of the aircraft 900 and material procurement 804. During production, component and subassembly manufacturing 806 and system integration 808 of the aircraft 900 takes place. Thereafter, the aircraft 900 may go through certification and delivery 810 in order to be placed in service 812. While in service by a customer, the aircraft 900 is scheduled for routine maintenance and service 814 (which may also include modification, reconfiguration, refurbishment, and so on).

In accordance with various embodiments, the machine tool 104 having vibration reduction and/or using the techniques of reducing vibration of the workpiece 102 as disclosed herein, may be used during the material procurement 804, such as, and without limitation, to create structural features. In addition, during the component and subassembly manufacturing 806, the system integration 808, and/or the maintenance and service 814, aspects of workpiece vibration reduction may be advantageously employed to achieve the benefits discussed herein.

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 900 produced by exemplary method 800 may include an airframe 902 with a plurality of systems 904 and an interior 906. Examples of high-level systems 904 include one or more of a propulsion system 908, an electrical system 910, a hydraulic system 912, and an environmental system 914. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production process 806 may be fabricated or manufactured in a manner similar to components or subassemblies produced while the aircraft 900 is in service. Also, one or more apparatus embodiments, method embodiments, or a combination thereof may be utilized during the production stages 806 and 808, for example, by substantially expediting assembly of or reducing the cost of an aircraft 900. Similarly, one or more of apparatus embodiments, method embodiments, or a combination thereof may be utilized while the aircraft 900 is in service, for example and without limitation, to maintenance and service 814.

Illustrative Implementation

Figure 10:
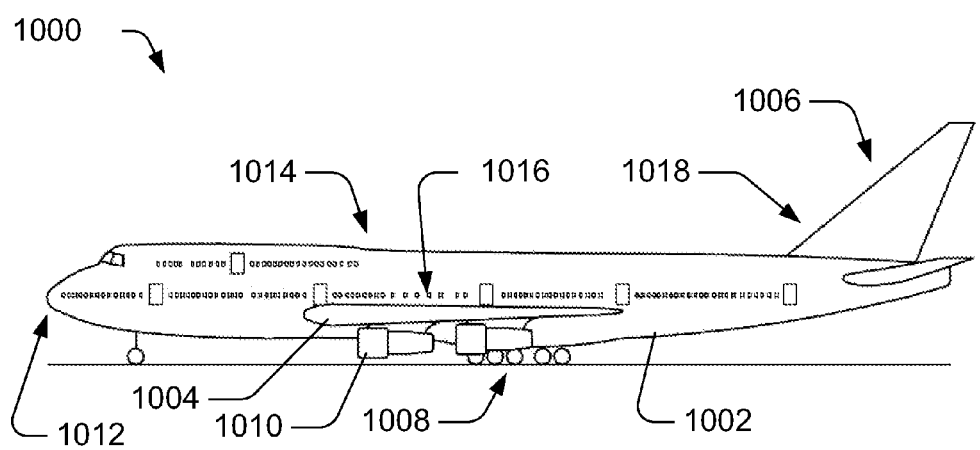
FIG. 10 is an illustration of a side elevational view of an aircraft having parts machined with workpiece vibration reduction in accordance with another embodiment of the disclosure.

FIG. 10 is a side elevational view of an aircraft having parts machined with workpiece vibration reduction in accordance with another embodiment of the disclosure. One may appreciate that workpieces with thin features, such as ribs or other structural support features may be employed in a wide variety of locations, including the fuselage, wings, empennage, body, and walls of the aircraft 1000. In alternate embodiments, workpieces with thin features may be used on other types of structures, vehicles, and platforms, such as motor vehicles, aircraft, maritime vessels, or spacecraft, or other suitable applications. For example, the aircraft 1000 may include many workpieces with thin features machined using the workpiece vibration reduction techniques as disclosed herein throughout the skin of the aircraft in accordance with an embodiment of the disclosure.

In this embodiment, the aircraft 1000 includes a fuselage 1002 including wing assemblies 1004, a tail assembly 1006, and a landing assembly 1008. The aircraft 1000 further includes one or more propulsion units 1010, a control system 1012, and a host of other systems and subsystems that enable proper operation of the aircraft 1000. One should appreciate that workpieces with thin features may be employed in any suitable portion of the aircraft 1000, such as in a fuselage 1002 with a fuselage joint assembly 1014, the wing assemblies 1004 with a wing assembly joint assembly 1016, the tail assembly 1006 with a tail assembly joint assembly 1018, and any other suitable areas of the aircraft 1000. In general, the various components and subsystems of the aircraft 1000 may be of known construction and, for the sake of brevity, will not be described in detail herein.

Although the aircraft 1000 shown in FIG. 10 is generally representative of a commercial passenger aircraft, the apparatus and methods disclosed herein, and the resulting workpieces created via the apparatus and method, may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft.

CONCLUSION

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method, comprising:
  engaging a machine tool to a machine operable to rotate the machine tool about a longitudinal axis of the machine tool, the machine tool comprising:
    a shank having a first end and a second end, the first end configured for engagement with the machine and the second end being distal from the first end; and
    a cutting portion proximate the second end of the shank, the cutting portion having a first diameter defined by one or more features used to remove material from a workpiece;
  placing a vibration dampener between the shank of the machine tool and the workpiece, the vibration reduction dampener formed from a compressible material and securely positioned on the shank at a location between the first end and the cutting portion and having a second diameter, greater than the first diameter, such that, upon machining engagement of the cutting portion to the workpiece, portions of the vibration reduction dampener are compressed against the workpiece and an axially-extending surface of the shank at a location between the workpiece and the axially-extending surface of the shank to dampen vibrations; and
  performing work on the workpiece by rotating the machine tool, where the vibration dampener absorbs vibrations of the workpiece that are caused by the performed work.

2. The method of claim 1, wherein the shank includes a recess to house the vibration reduction dampener, the recess having a diameter less than a diameter of the shank to allow for a greater degree of compression of the vibration reduction dampener.

3. The method of claim 1, wherein the work performed on the workpiece by rotating the machine tool involves cutting a cutting surface of the workpiece, which cutting surface is located on a portion of the workpiece having a height that is greater than a thickness of the portion.

4. The method of claim 1, wherein the dampener is attached to the shank via a press fit.

5. The method of claim 1, wherein the dampener is coupled to the shank.

6. The method of claim 1, further comprising pressing the dampener around the shank, the dampener comprising a collar where the dampener engages the shank with friction.

7. The method of claim 6, wherein the dampener is positioned in a recess defined along the shank.

8. The method of claim 1, wherein the placing the vibration dampener between the shank of the machine tool and the workpiece includes securing the vibration dampener against a shoulder defined on the shank.

9. The method of claim 1, further comprising:
  cleaning a desired attachment surface of the shank to receive the vibration dampener; and
  selecting the vibration dampener to fit the desired attachment surface.

10. The method of claim 9, further comprising:
  attaching the vibration dampener to the shank with an adhesive.

11. The method of claim 1, wherein the vibration reduction dampener comprises:
  a cylindrical collar, wherein the second diameter is an outer diameter of the cylindrical collar of a size such that, when compressed, the compressed diameter is substantially similar to the first diameter of the cutting portion of the machine tool, the cylindrical collar including:

an outer layer having an exterior surface, and an inner layer formed of a compressible material, the inner layer being attached around the shank of the machine tool between the cutting portion and the first end of the shank distal from the cutting portion.

\* \* \* \* \*